United States Patent [19]
Funk et al.

[11] 3,950,147
[45] Apr. 13, 1976

[54] PROCESS FOR FEEDING COAL TO A FLUIDIZED BED OR SUSPENDED PARTICLE PRESSURIZED PROCESSING CHAMBER AND APPARATUS FOR CARRYING OUT THE SAME

[75] Inventors: Erwin D. Funk; Oliver A. Laakso; James R. Prough, all of Glens Falls, N.Y.

[73] Assignee: Kamyr, Inc., Glens Falls, N.Y.

[22] Filed: Aug. 8, 1974

[21] Appl. No.: 496,024

[52] U.S. Cl.................. 48/86 R; 48/197 R; 48/210;
48/DIG. 7; 110/7 S; 110/31; 110/101 R;
209/2; 214/17 B; 214/17 CC; 222/194;
302/14; 302/66
[51] Int. Cl.²......................................... C10J 3/50
[58] Field of Search ............. 48/197, 202, 203, 206,
48/210, 63, 73, 76, 77, 68, 86 R, 86 A, 87,
89, 99, 101, DIG. 3, DIG. 4, DIG. 7; 302/11,
14, 15, 16, 66; 214/35 A, 17 CC, 17 R, 17 B;
110/165 R, 171, 31, 101 R, 7 S; 222/194;
209/2, 11, 12, 234, 258, 256, 268; 210/247,
400; 162/237, 246

[56] References Cited
UNITED STATES PATENTS

| | | | |
|---|---|---|---|
| 2,738,263 | 3/1956 | Peery et al. | 48/206 |
| 2,743,217 | 4/1956 | Silsby | 48/206 |
| 2,901,149 | 8/1959 | Richter | 222/367 |
| 2,914,223 | 11/1959 | Richter | 222/194 |
| 3,429,773 | 2/1969 | Richter | 162/237 |
| 3,849,247 | 11/1974 | Richter | 162/237 |

FOREIGN PATENTS OR APPLICATIONS

| | | |
|---|---|---|
| 174,094 | 5/1959 | Sweden |
| 324,949 | 6/1970 | Sweden |

*Primary Examiner*—S. Leon Bashore
*Assistant Examiner*—Peter F. Kratz
*Attorney, Agent, or Firm*—Cushman, Darby & Cushman

[57] ABSTRACT

A process for providing pressurized, pulverized coal for use in combustion or gasifying of coal by the fluidized bed or suspended particle combustion principles which comprises the steps of introducing lump coal, of stoker size to run of mine size, into a low energy liquid circulation stream; transferring the lump coal to a high energy, high pressure, liquid circulation stream; separating the lump coal from the high energy liquid circulation stream by lifting the coal through a free liquid surface, said high energy liquid draining from the coal by gravity; directing the coal by gravity transfer to a continuous mechanical dryer for removal of surface liquid; gravity transfer to a coal crusher for major size reduction; gravity transfer to a coal pulverizer for size reduction necessary for the gasification processes; transfer of pulverized coal by gas circulation from the pulverizer to a cyclone separator, said circulating gas used in the pulverizer for coal particle classifying; and final injection of the pulverized coal to a fluidized bed or suspended flow coal gasifier or any pressurized combustion chamber, and apparatus for carrying out the process comprising a combination of known components.

25 Claims, 4 Drawing Figures

PROCESS FOR FEEDING COAL TO A FLUIDIZED BED OR SUSPENDED PARTICLE PRESSURIZED PROCESSING CHAMBER AND APPARATUS FOR CARRYING OUT THE SAME

This invention relates to a method and apparatus for feeding pulverized coal or the like to a processing chamber under pressure where the coal is converted into a combustible synthesis gas or heat; most especially for coal gasification.

Known methods of producing a combustible synthesis gas from coal usually involve charging coal to a vessel and reacting the coal with air or oxygen with steam addition. Simply, the reaction is a controlled combustion of portions of the coal's carbon with oxygen to produce the heat necessary to cause the reforming of the steam with the coal's remaining carbon to produce carbon monoxide (CO) and hydrogen ($H_2$) both being combustible gases. Some methane ($CH_4$) is produced in small amounts during the reforming. The production of hydrocarbon gases ($C_nH_m$) increases the heating value of a unit volume of produced gas. It must be noted that carbon dioxide ($CO_2$), a non-combustible gas is produced during the combustion. For high heating values per unit volume of gas, the $CO_2$ must be scrubbed from the product gas.

The mechanical means of performing the gasification has been developed for near atmospheric pressure gasifiers. The predominant types of gasifiers use the principles of fixed beds, fluidized beds, or coal particles in suspension. The fixed bed type of gasifier primarily consists of a vessel containing a bed of coal, the particles being ¼ to 2 inches. Coal is supplied to the vessel through a lock hopper. The bed moves down through the vessel with very little relative motion of the coal particles with each other. The fluidized bed gasifier consists of a vessel containing small coal particles, less than ⅜ inch, all in motion relative to each other. The particles are maintained in a state of agitation by the reactant gases. In other words, the gases and coal particles appear to move in the bed as an agitated fluid. The third type of gasifier operates on the suspended particle principle where small coal particles, usually less than 100 mesh size, are entrained with one of the reactant gases and blown into a combustion chamber. There are usually relatively large spacial distances between each particle causing a more intimate contact with the reactant gases.

Recent trends for gasification are to obtain a greater throughput of coal and to obtain a greater amount of methane in the product gas. It has been experimentally shown that both the throughput of coal and amounts of methane produced are increased by operating the gasifiers at elevated pressures. The fixed bed gasifiers are adaptable to increased pressures by feeding the coal through lock hoppers by incorporating a pressurizing and venting cycle with the hopper filling and discharging cycles. The feeding of the fluidized bed and suspension gasifiers are inherently more difficult when under pressure. The coal must be fed continuously to prevent upsetting the gasification reaction. The current state of the art in feeding the pulverized coal is to slurry the finely sized coal with oil or water and then pump the slurry to the gasifier pressure. The slurry is then heated by the hot product gases to flash off the water or oil. This flashing results in producing condensibles in the product gas that must later be condensed out by cooling the product gas. Severe energy penalties are a result of this coal feeding method. The energy wasted to flash off the water or oil is more valuably used to produce steam for power generation in waste heat boilers. Further energy is wasted to achieve the condensing. Additionally, slurry preparation adds to this energy burden. Experimental devices to extrude or squeeze the liquid from the slurry are presently in testing stages. These devices will improve the feeding processes by reducing the energy losses. Energy losses will still be significant since pulverized coal contains large amounts of surface water that cannot be squeezed out. The extruders will produce a cake that must be broken up by other mechanical devices since the cake cannot be directly introduced to the gasifier.

An object of the present invention is to provide a process for feeding pulverized coal and the like to pressurized processing chambers, particularly fluidized bed and suspension coal gasifiers which significantly reduces the energy losses created by present feeding methods. In accordance with the principles of the present invention, this objective is obtained by utilizing lump coal in a size range from stoker to run of the mine as the introductory feed product rather than finely sized coal, continuously and progressively bringing the lump coal to a high pressure condition similar to that utilized in the processing chamber by moving the lump coal upwardly through a free liquid surface of a confined volume of liquid forming a part of a continuous high energy liquid flow into which successive volumes of lump coal particles entrained in liquid are transferred from a separate continuous low energy liquid flow into which the lump coal is initially introduced and then processing the lump coal while maintained under such high pressure conditions into a finely sized dry form for use in the processng chamber.

By initially pressurizing the coal in lump form rather than in finely sized form, several distinct advantages are obtained. On a unit weight basis of coal handled, a slurry of pulverized coal contains coal with surface areas many magnitudes greater than large particle coal. The spacings between pulverized coal are small thus causing the coal to retain more than just surface liquid due to the cohesive surface tension forces of the liquid between individual pulverized particles. The large particles minimize these forces thus allowing drainage to the point of retaining mostly surface water. The water drained is recirculated while still under pressure, to continue in the transfer of more coal. Two energy saving principles are introduced by the present invention. First, large amounts of heat required by present methods to flash off the conveying liquid is eliminated. Secondly, since the conveying liquid is continually recirculated under pressure to provide for conveying of more coal, the energy required to maintain the pressure of the conveying fluid is minimized since the only energy input required for the high pressure liquid circuit is that necessary to overcome the pressure losses due to frictional losses in the piping.

Another object of the present invention is the provision of apparatus for carrying out the aforesaid method which comprises a combination of components, each of which is known per se and thus has proven performance characteristics in other different combinations. In its more specific aspects the apparatus components for carrying out the various steps of process of the present invention include the following. Known coal handling equipment is utilized to introduce lump coal, size range from stoker to run of mine, into a low energy liquid circulation system maintained by known piping and a centrifugal pump; a feeding device known in the pulping industry, and disclosed in U.S. Pat. No. 3,429,773 and Swedish Pat. Nos. 174,094 and 324,949 is utilized to transfer successive volumes of coal and entrained liquid to a high energy level liquid circulation system likewise maintained by known piping and a centrifugal pump; a known mechanical separator (U.S. Pat. No. 3,429,773) is utilized to lift the coal through a free liquid surface where the liquid drains by gravity from the coal; a mechanical dryer fed by gravity is utilized to remove surface water from the coal; a crusher fed by gravity is utilized for major size reduction; a classifying pulverizer fed by gravity is used for final size reduction; and a cyclone separator fed by gas flow is used to convey the coal into the processing chamber. Moreover, with the present invention it becomes possible to utilize known components having known advantages. For example, prior art methods of conveying a slurry of pulverized coal require the use of piston pumps since centrifugal pump state-of-the-art allows for pressure rises to approximately 200 feet of water head or approximately 90 psig. The use of piston pumps introduces greater maintenance problems due to abrasive wear on piston rings and valves. Because the present method involves the maintenance of separate high and low energy liquid circuits rather than one circuit having high and low energy portions, it is possible to use centrifugal pump components in the apparatus combination, thus significantly reducing maintenance problems since no sealing surfaces are necessary.

The utilization of the known coal/liquid separator is highly advantageous in that a free liquid surface is constantly maintained which provides a seal against gas back flow into the coal feeding system. Thus the combined feeding apparatus, in general, requires no mechanical contact of sealing surfaces. The elimination of contact sealing surfaces greatly increases the service life of the apparatus and the reliability of the feeding operation.

The mechanical dryer, crusher, pulverizer, and cyclone separator are in common use throughout the coal industry; various styles are available for each of these items. These components will be operated at elevated pressures in the present apparatus, whereas they are now in common use for near atmospheric pressure. The incorporation of the mechanical dryer for surface water removal, the crusher, the pulverizer, and the cyclone separator in the present invention does not result in the burden of additional feeding equipment; since with the present systems, this equipment is already in use to supply pulverized coal for slurry preparation.

These and other objects of the present invention will become more apparent during the course of the following detaned description and appended claims.

The invention may best be understood with reference to the accompanying drawings wherein an illustrative embodiment is shown.

The process of the present invention, as previously indicated, comprises the steps of maintaining a continuous flow of liquid along a first flow path, substantially continuously introducing a supply of coal particles in lump form, of stoker size to run of mine size, into the liquid flowing along the first flow path at a feeding position therein, substantially continuously removing from communication with the first flow path at a transfer position downstream from the feeding position successive volumes of coal particles entrained in liquid while permitting liquid with coal particles smaller than a predetermined size range to flow with liquid along the first flow path downstream of the transfer position, maintaining a continuous flow of liquid at an energy level in excess of the energy level of the liquid in the first flow path along a second flow path, substantially continuously communicating the successive removed volumes of coal particles and entrained liquid with the liquid flowing in the second path at a transfer position therein, continuously confining the liquid and entrained coal particles in the second path at a discharge position downstream from the transfer position within a volume presenting a free liquid surface in communication with a zone maintained under pressure while permitting the liquid and coal particles less than a predetermined size to continuously flow downstream of the discharge position, substantially continuously moving the coal particles in the confined volume upwardly through the free liquid surface and into the pressure zone, substantially continuously converting the coal particles moved into the zone into coal in a dry, finely sized form while maintaining the same under high pressure and then substantially continuously feeding the coal in dry, finely sized form into a fluidized bed or suspended particle processing chamber under a predetermined elevated pressure where the coal is continuously converted into gas and/or heat.

Figure 1:
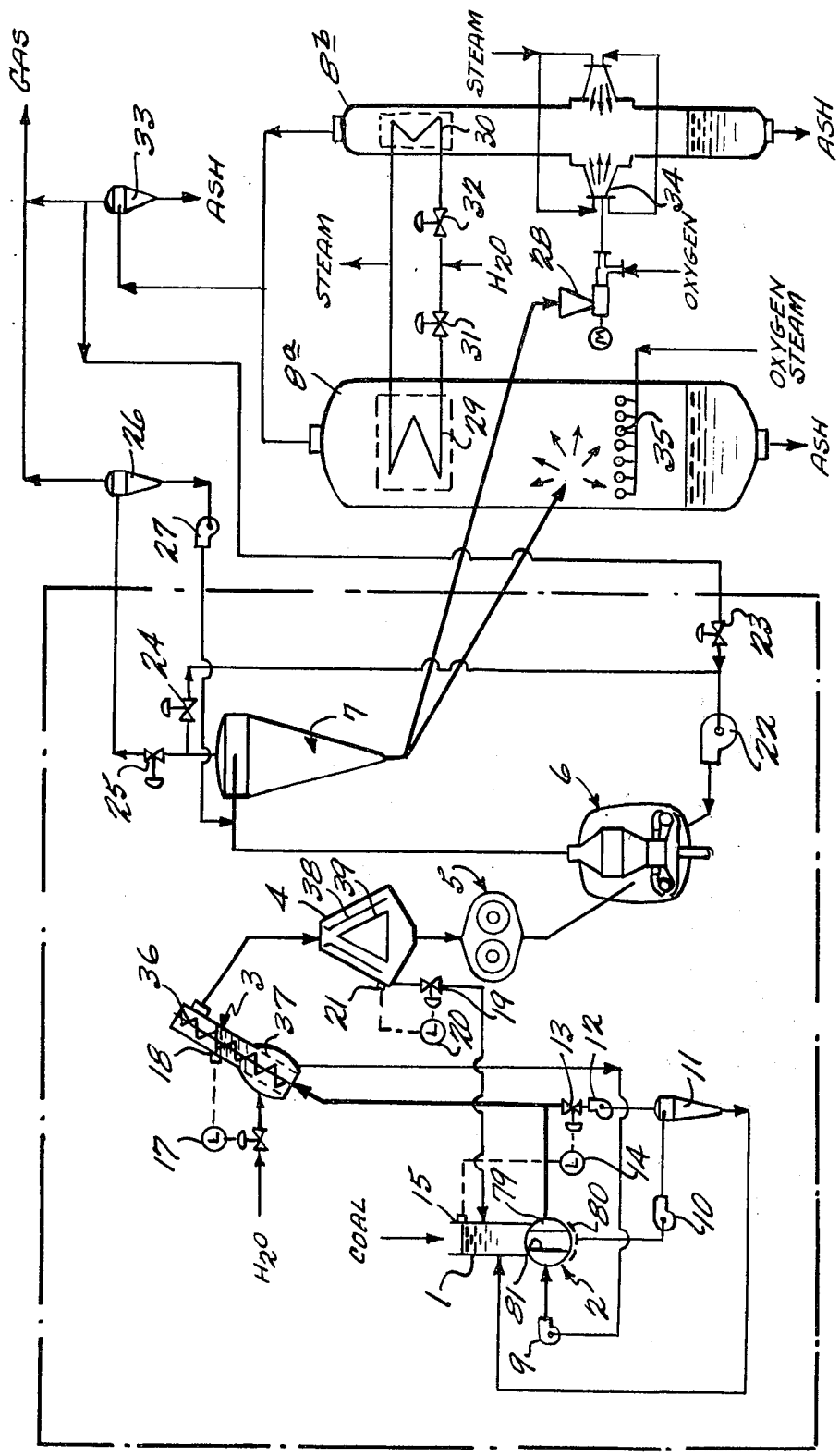
FIG. 1 is a schematic view indicating the flow of coal in the feeding process and the process relationship to a fluidized bed and a suspension bed coal gasifier, the boxed-in portion of the schematic representing the apparatus for carrying out the process.

The basic apparatus components utilized in carrying out this process are schematically illustrated in FIG. 1 as a chute 1 forming a part of the first flow path, a transmission device 2 for effecting the transfer of successive volumes of coal and entrained liquid from communication with the first flow path into communication with the second flow path, a separator 3 which forms a part of the second flow path and confines the free liquid surface volume through which the coal particles are moved.

The apparatus used to convert the lump coal into dry, finely sized coal includes a continuous vertical centrifuge 4, a crusher 5, a pulverizer 6, and a cyclone separator 7. The coal issuing from the cyclone separator 7 is fed both to a processing chamber exemplified by fluidized bed gasifier 8a and a suspended particle gasifier 8b.

An understanding of the manner in which the basic apparatus componets 1–7 are interrelated with one another and with the gasifiers 8a and 8b is schematically illustrated in FIG. 1.

Figure 3:
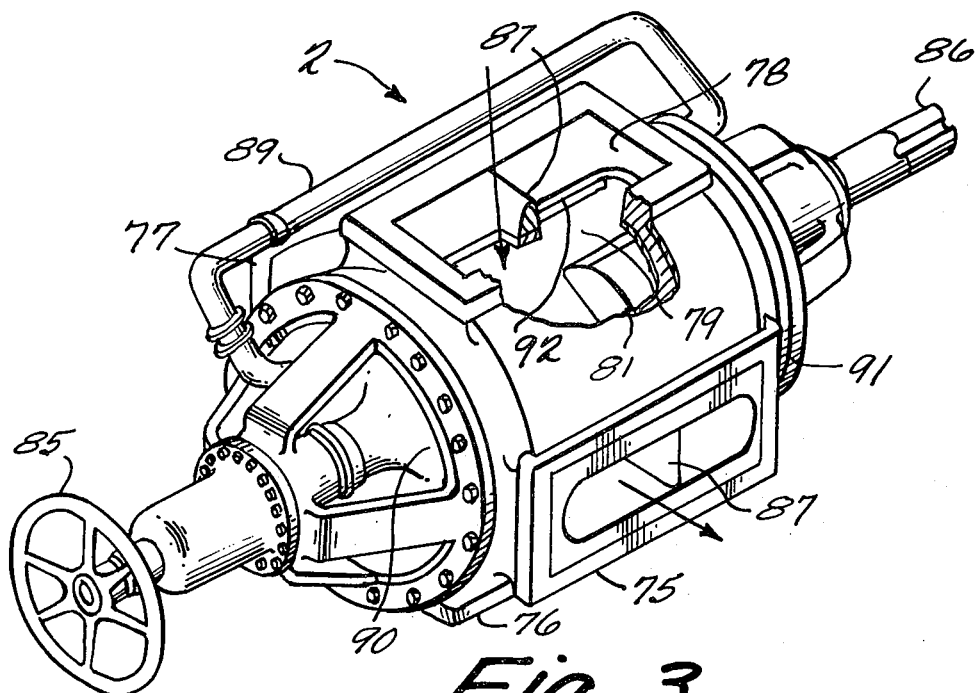
FIG. 3 is a perspective view of the coal transmission device component of the apparatus.
Figure 4:
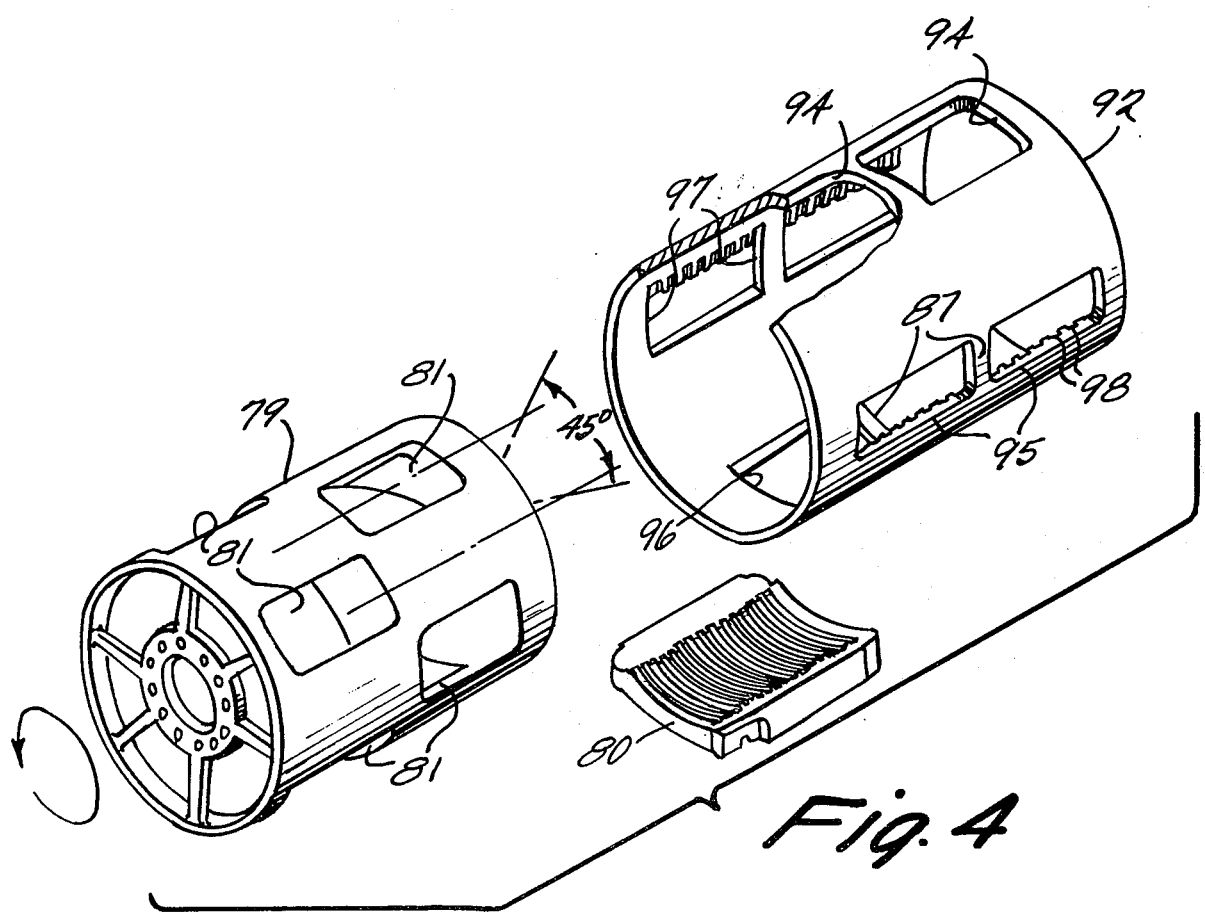
FIG. 4 is an exploded perspective view illustrating certain parts of the device shown in FIG. 3.

With reference to FIG. 1, coal is introduced from an atmospheric bin into the liquid filled chute 1. The liquid will henceforth be known as water. The water level in chute 1 is held constant. A low energy water circulation system is established through transmission device 2, said low energy water circulation starting at chute 1 continuing through transmission device 2, pump 10, centrifugal clarifier 11 and back to chute 1. As will become more apparent in the subsequent detailed description of the structure and operation of the transmission device of which is depicted in FIGS. 3 and 4, the transmission device includes, in general, a housing 78 a rotor 79 havng pockets 81 therein and a screen 80 in the housing 78. When coal enters the water of chute 2 it is carried downward into a through going rotor pocket 81 of transmission device 2. The majority of the coal is retained in the rotor pocket 81 by the screen 80 located in the transmission device housing 78. The water and some coal fines of a maximum predetermined size pass through screen 80. The water and fines pass through slurry pump 10 and are discharged at an elevated velocity tangentially into centrifugal clarifier 11. The majority of the water and nearly all of the fines are discharged from the bottom of clarifier 11 and returned to chute 1 to continue the filling of pockets 81 in the transmission device rotor 79. As the transmission device rotor turns the retained coal is transferred, displaced into a high energy water circulation system, the high energy level being equal or nearly equal in pressure to that of the coal gasifier 8. Generally, the pressure at the transmission device 2 will be of greater pressure than that of the gasifier due to water head and piping frictional losses in the high energy water circulation system.

The high energy water circulation system starts at slurry pump 9 where the motive force is supplied for the circulation. Water is discharged from slurry pump 9 through the transmission device rotor pocket 81 having previously retained coal from the low energy water circulation system. The retained coal is entrained in the water from the slurry pump 9 and conveyed continuously to the separator 3. The separator includes means for lifting the coal from the water in which it is entrained under pressure so as to allow the water to drain from the coal by gravity. The separator may be any device with an enclosed housing to maintain pressure, to maintain a free liquid surface, and to provide for screening of coal from the water so as to allow water to be removed to sustain the free liquid surface at a constant level. The separator 3 shown schematically in FIG. 1 is a known commercial inclined screw separator common to the pulp industry disclosed in U.S. Pat. No. 3,429,773. In this type of separator, coal is lifted by an inclined screw conveyor 36 through the water surface and discharged; the water is drained through a screen 37 surrounding the screw conveyor, and returned to slurry pump 9. The separator may also be of the vertical screw type illustrated in FIG. 2 and designated or may be of a multiple outlet type as that commonly assigned U.S. Pat. application Ser. No. 339,761 now U.S. Pat. No. 3,843,468. Any functional type of gravity separator is adequate as long as it is pressure containing and maintains a free water surface through which coal is removed and the surface is maintained constant. The constant free water surface functions to prevent gas back flow into the coal transmitting apparatus.

The transmission device 2 is common to the low and high energy liquid circulation system and accomplishes the continuous transfer of coal from the low energy system to the high energy system without applying mechanical force to the coal. As will become apparent in further description, the transmission device rotor 79 does not come in intimate contact with the transmission device housing 78, consequently there is a continual leakage of water from the high energy water circulation system to the low energy water circulation system. This increase in water to the low energy system tends to cause an upward water velocity in chute 1 and a rise of water level in chute 1. The upward water velocity in chute 1 would tend to prevent small coal particles from settling into the transmission device 2. The upward water velocity is prevented by the circulation created through the transmission device 2 by pump 10. The rise in water level is counteracted by extracting water from the low energy water circulation system in an equal amount to that which is leaked into the system, the extraction is accomplished by centrifugal clarifier 11 such extraction being from the top of clarifier 11 or the purified liquid port and pump 12 which serves to increase the pressure of the extracted purified water from the low pressure to high pressure. The amount of water extracted from the low energy water circulation system is controlled by chute 1 level sensing device 15 which modulates the opening of valve 13 via level controller 14. In this way, water leaked from the high energy water circulation system is returned thereto. There will always be a small amount of water lost from the high energy water circulation system due to adherence to the coal. This loss of water is reflected as a drop in the level of the free water surface in separator 3. This loss of water is continually replenished by a makeup water system, provided by level sensor 18 modulating the opening of a water supply valve 16 via level controller 17.

Coal fines will not heavily concentrate in the low and high energy water circulation systems. The concentrating is kept to small particle sizes by the openings in screens 80 and 37. The fines concentration will be kept low since the majority of fines will be carried from the separator 3 by the large particle coal, said large particles acting to screen the fines from the liquid. Pumps 9 and 10 are slurry pumps needing only to provide small head rises, within current state-of-the-art, to overcome pipeline frictional losses.

Coal discharged from separator 3 is directed by gravity to an apparatus to further remove surface water from the pressurized coal, such a mechanical dryer being depicted in FIG. 1 as a continuous vertical centrifuge 4. Such devices are known to operate effectively at or near atmospheric pressure. Operation at elevated pressure requires only increased housing strength. Continuous screen bowl centrifuges have been operated at elevated pressures. The drying apparatus used in the present invention is highly dependent upon the size and type of coal. The general purpose of the mechanical dryer in the present invention is to increase the thermal efficiency of the coal gasifier and to remove surface moisture from the coal to prevent caking of coal in the subsequent coal pulverizer 6. The coal gasifier can accept inherent moisture in the coal since the inherent moisture will flash to steam during combustion. This flashing to steam is not detrimental to the gasification from a reaction standpoint since steam is used in the synthesis gas production. For thermal efficiency, the inherent moisture must be considerably less than that required for reaction or a thermal loss to unused steam will transpire. Surface moisture on the coal, as fed into the pulverizer 6, tends to cause the fine particles to conglomerate. This reduces the pulverizer capacity because of inability to effect efficient separation in the grinding zone. Drying may be accomplished in the pulverizer, but for efficient pulverizing, surface water entering the pulverizer must be minimized. Roughly 1 percent moisture will result in a 1 percent reduction in pulverized capacity. As mentioned previously, draining of the coal is improved by feeding coarse particles. Feeding of coarse particles, greater than 1 inch requires a major size reduction before being introduced to the pulverizer. Such a major size reduction is accomplished by a crusher 5. Crushing the coal exposes new surface area thus reducing the ratio of surface moisture to surface area of coal after crushing and a subsequent increase in capacity of the pulverizer 6.

The mechanical drying can be accomplished by two basic methods: (1) by tabling which is a method of passing the coal over an oscillating table that shakes the coal causing water to migrate from the coal by gravity and pass from the table, said tabling being most effective on coals coarser than 1 inch size; and (2) by centrifuge separation which is a method of spinning the coal in a basket like device where centrifugal forces sling the water from the coal. Both of these methods are continuous and lend themselves to be encased in pressurized housings for elevated pressure operation, requiring only rotary shaft seals. The centrifuge is the preferred device since it has a greater ability to remove surface water from the smaller coal particles. For the purpose of this invention either type may be used or a combination of tabling and centrifuging may be used following a pressurized size screening, the coal size distribution and surface moisture content after draining being the determining factors.

The vertical centrifuge depicted in FIG. 1 receives coal by gravity from separator 3. The coal drops into an annular opening between the smaller end of two concentric spinning cones 38 and 39, the outer cone 38 being hollow to internally accept the inner cone. The outer cone 38 is screened. The two cones are rotating at nearly the same speed. The inner cone 39 contains a spiral scraper around its periphery, nearly touching the inner surface wall of the outer cone 38 from which the coal particles are to be scraped. The speed of the cones is chosen to allow the coal particles to be forced against the outer cone 38 while the water is discharged by centrifugal force through the outer cone 38 perforations. The differential speed between the two cones is selected to cause the scraper to move the coal to the larger end of the cones for dry discharge. If the cone angle is large, centrifugal forces will help roll the coal particles along. In this case, the scraper will tend to hold the coal particles back until they are dewatered, rather than push them ahead. The water passing through the perforations will pass to a trap in the dryer for draining back to chute 1. A free water surface is maintained in this trap to prevent gas escape. The level is maintained by level sensor 21 controlling the opening of valve 19 via controller 20.

After being dried of surface water, coal is fed by gravity to a crusher 5 for major size reduction, such a size reduction being necessary to break up large particle coal in the supply to a size acceptable to the pulverizer 6. There are many types of commercial coal crushers that are acceptable, the limiting factor being the ability to operate at elevated pressures. The following types are adequate: Bradford breaker, single roll crusher, double roll crusher, Hammermill, ring crusher, cone crusher or jaw crusher. The crusher 5, represented in FIG. 1, is a double roll crusher.

Following crushing, the coal moves by gravity to the pulverizer 6, represented in FIG. 1 as a ball and race type crusher which is a common commercial type. Most pulverizers are capable of operating at elevated pressures since they are now designed to sustain pressures of 50 psig to meet "Fire Underwriters Code." A pulverizer using internal gas size classification is most desirable since hot gas may be used to further reduce the moisture content of coal. Drying during pulverizing is a common practice now using hot air. Pressurized ball mills, attrition mills, and ring-roll mills are additionally acceptable for the pulverizing step.

Since the coal gasifier 8 produces a hot synthesis gas, 2000° to 2500° F., hot synthesis gas may be used in the pulverizer for further drying. The inherent moisture content will determine the necessity of this drying, such drying being dependent on the coal type and its properties. The pulverized coal is swept by gas velocity from the grinding zone of the pulverizer 6 through an internal classifier generally using the cyclone effect to cause the heavy coal particles, particles not sufficiently pulverized, to drop back into the grinding zone. The particles sufficiently pulverized will be swept by gas to a cyclone separator 7 where centrifugal forces of the spinning gas and coal cause the pulverized coal to drop out in the bottom of the cyclone separator. The purified gas flows from the top of the cyclone separator through a central pipe. For coal that is relatively dry of inherent moisture the gas will be mostly recycled to the pulverizer through valve 24 and fan 22. For coal that has too much inherent moisture the gas will be a combination of hot synthesis gas and recycle gas to control the temperature of the gas in the pulverizer above the dew point of the water inherent to the coal. This temperature control is accomplished by throttling valves 23 and 25. The typical control is: valve 25 is throttled open to allow cool gas to escape from the recycle system into the synthesis gas discharge to product use. While being discharged, the cool gas is passed through a secondary cyclone separator 26 to prevent carryover of coal fines to the product gas. A variable speed fan 27 recycles the carryover to cyclone separator 7. Valve 23 is additionally throttled open to allow hot synthesis gas to mix with the recycle gas. The combination of openings of valves 23 and 25 controls the recycle gas temperature. Valve 24 controls the gas velocity in the recycle system. This gas velocity may also be controlled by the speed of fan 22. Velocity control of the recycle gas is necessary for proper size classification of the coal in the pulverizer 6.

Pulverized coal from cyclone separator 7 is directed to either a fluidized bed coal gasifier 8a or a coal gasifier 8b for suspension gasification. These gasifiers are represented in FIG. 1 to show the relationship with the feeding process of this invention. Commercial gasifiers of these types are available for atmospheric pressure gasification of coal.

Pulverized coal is directly injected into the fluidized bed gasifier 8a, in most cases by a feed screw, not shown in FIG. 1. The pulverized coal is fluidized by the reactant gases, usually steam and oxygen for higher BTU synthesis gas production. The steam and oxygen are introduced via a manifold of nozzles 35. Ash drops to a water chamber in or at the bottom of the gasifier for cooling and removal. The produced synthesis gas is passed through a waste heat boiler 29 for energy recovery and then discharged from the gasifier. The waste heat boiler additionally assists in the cooling of carryover ash below the ash fusion temperature so that it can be removed without collecting on the discharge system walls.

For the suspension coal gasifier 8b, pulverized coal is directed to a pulverized coal pump 28, a commercial device, for mixing pulverized coal with one of the reactant gases, usually the oxygen. The mixed pulverized coal and oxygen are injectd along with steam through nozzles 34 peripherally around the gasification zone. This nozzle configuration causes impingement of the nozzle discharges with resulting severe turbulence, providing more intimate contact of coal with the reactant gases and thus a more efficient gasification. The reaction is very fast. The ash produced drops into a water chamber at or in the bottom of the gasifier for cooling and removal. The synthesis gas produced passes upward through a waste heat boiler 30 in the top of the gasifier for energy recovery and to cool the ash that is carried over with the synthesis gas to prevent ash collection on the discharge system walls. Valves 31 and 32 control water flow to the waste heat boilers for steam production. Ash leaving the gasifiers is removed by a cyclone separator 33 prior to the takeoff of hot synthesis gas to the pulverizer.

Figure 2:
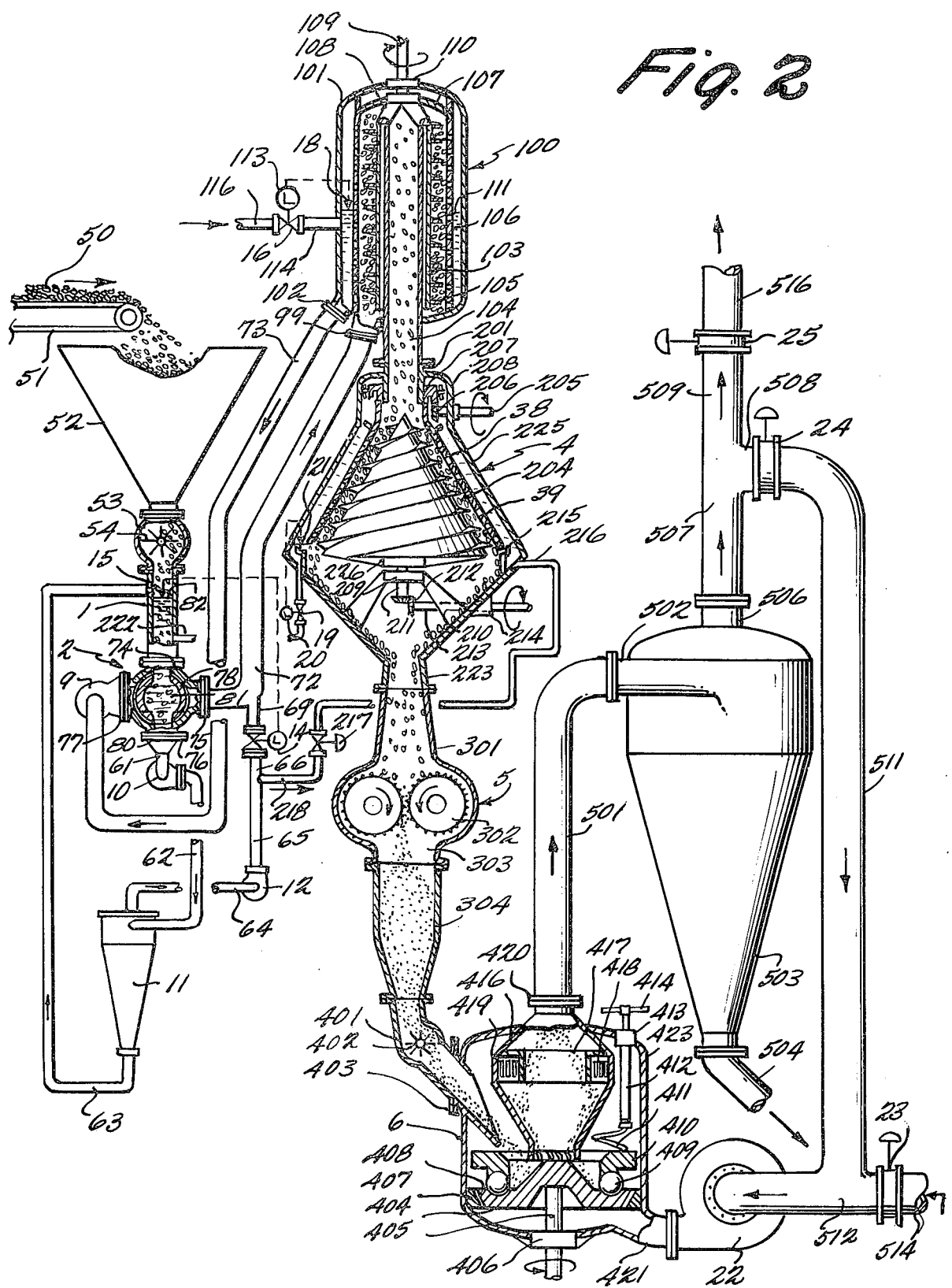
FIG. 2 is a somewhat more constructional view of the boxed-in portion of FIG. 1.

To illustrate more specifically, a representative preferred form of apparatus for carrying out the feeding process principle, reference is now made to FIG. 2 wherein the apparatus is shown somewhat constructionally wherein like reference numerals indicate like parts. The coal 50 is supplied by conveyor 51 to bin 52. Bin 52 contains a supply of coal to counteract upsets in the conveyor system. Coal is moved by gravity to metering device 53, containing a metering wheel 54, said wheel controlling the coal feed rate. Coal is spilled by gravity into chute 1 containing water at a controlled level 82. At this point the coal sinks by gravity and by liquid drawing action into transmission device 2. The coal enters transmission device 2 inlet port 74 and then into a through going pocket 81 of the rotor 79. The coal is retained in pocket 81 by screen 80 located in outlet port 76. Water is drawn through screen 80 by slurry pump 10 via conduit 61. The pump 10 motivates the low energy water circulation system through conduit 62, centrifugal clarifier 11, conduit 63, chute 1 where more coal is entrained, transmission device 2 where coal is removed, and through conduit 61 back to pump 10. All during this circulation of low energy water, rotor 79 is turning in housing 78 to cause continual removal of coal from the filled pocket. The continuousness of coal removal will become more apparent in this description. As rotor 79 turns, the coal filled to through-going pocket 81 comes in communication with transmission device ports 75 and 77. High energy water discharged from slurry pump 9 flows through pocket 81 carrying the coal from the pocket through conduits 71 and 72 and into inlet port 99 of a separator 100 of the vertical type rather than of the inclined type such as shown at 3 in FIG. 1. The water is separated from the coal and discharged from the separator 100, outlet 102 via conduit 73, back to pump 9 completing the high energy water circulation system. The removal of coal is also occurring continuously; this removal will, again, become more apparent in later description.

The rotor 79 does not come in intimate contact with housing 78, therefore, leakage occurs from high pressure ports 75 and 77 to low pressure ports 74 and 76. This water leakage results in an increase of water in the low energy water circulation system which appears as an increase in water level in chute 1. Additionally, water is added to the low energy water circulation system when coal displaces water in the pocket 81 during the filling of the pocket, said water addition also appearing as a water level rise in chute 1. To prevent water level rise in chute 1 and the drying up of the high energy water circulation system, the water must be returned to the high energy water circulation system. This return of water is accomplished by extracting water from the low energy circuit and pumping it to the high energy circuit, such pumping being against the full pressure of the gasifier along with the liquid head of the high energy circuit. To accomplish this pressure rise, the pump must receive relatively clarified water, i.e., small amounts of entrained coal particles. The low energy water circuit will contain small coal solids by virtue of their having passed through screen 80 of the transmission device. Centrifugal clarifier 11 provides for such solids removal. Clarified water is removed from the top of clarifier 11 through conduit 64; pump 12 increases the water pressure to a value greater than that of the high energy water circulation system and discharges said water to conduit 65 and 66. Valve 13 is throttled to control the amount of water returned to the high energy circuit via conduit 69. The throttling of valve 13 is controlled by level sensing device 15 via controller 14, said level sensor maintaining a constant water level in chute 1.

The transmission device 2 is shown in detail in FIGS. 3 and 4 and includes a pocketed rotor 79 containing two rows of diametrically through going pockets 81, each row containing two through going pockets perpendicular to each other presenting four open ports equally spaced sround the periphery of the rotor for each row. The two rows of pockets are parallel, one row being 45 degrees displaced peripherally from its adjacent row as is shown in FIG. 4. The pocketed rotor 79 is encased by housing 78 and mounted for rotation within a housing liner 92. As best shown in FIG. 4 the liner 92 includes four ports, 94, 95, 96 and 97, equally spaced around the periphery of the housing which register respectively with inlet 74, inlet 75, outlet 76 and outlet 77. Each port is more than twice as wide as the sum of two pockets in the pocketed rotor and a divider 87 is located midway in each housing port to separate the same into two parallel ports, as clearly depicted in FIGS. 3 and 4.

The pocketed rotor 79 may be either cylindrical or tapered: illustration of such being shown in FIGS. 3 and 4 as tapered with rotor diameter increasing in the direction of a clearance adjusting hand wheel 85. Tapering of the rotor 79 provides for adjustment of the clearance between the rotor 79 and housing liner 92; additionally, increase in clearance due to wear can be taken up by turning hand wheel 85 pushing rotor 79 toward a shaft drive end 86 shown in FIG. 3. The pockets 81 through rotor 79, in a row, loop over each other so as to provide passage through the rotor while maintaining inline openings in the rotor, around the periphery of the rotor. While looping the pocket becomes narrower but wider, such widening being shown in FIG. 2; the narrowing being necessary to accomplish the looping over of passages and the widening being provided to maintain a nearly constant pocket cross-sectional area for liquid and coal particle flow.

Coal particles entering the transmission device 2 with liquid through inlet 74 are drawn by gravity and liquid motion provided by pump 10 through ports 94 and 96. A screen 80 is disposed within each port 96 so that water passes through each screen 80 but particles of the predetermined size range larger than the screen opening are thus held in the communicating rotor pocket 81. As the filled pocket 81 rotates and begins to approach a position nearly perpendicular to its filling position, water in the discharge flow path from pump 9 is forced through port 97 into the pocket causing discharging of coal particles from the pocket through port 95 into conduit 71. Before the pocket again rotates to the filling position all coal particles are emptied into conduit 71 leaving only water in the pocket. The pocketed rotor 79 rotation is continuous but the filling and emptying of pockets in a single row of pockets is intermittent. Since the adjacent parallel row of pockets is displaced 45 degrees peripherally, intermittent filling and discharging rows of pockets is continuous. The continuous operation is an effect of the peripheral displacement of the two parallel rows of pockets, such displacement being shown in FIG. 4, for as the pocket is closing to a housing inlet port a pocket is opening to the same port thus always maintaining a constant open cross section through the filling ports 94 and 96 and the discharging ports 95 and 97 making the filling and discharging systems continuous.

The transmission device 2 is uniquely characterized by several important internal features. The first of these is the ability to transfer coal particles from one flow path to another flow path at higher pressure without the need for positive sealing surfaces. According to the present invention the rotating pocketed rotor 79 need not come into intimate contact with the housing liner 92 but may present a clearance therewith. Since ports 94 and 96 are at a lower pressure than ports 95 and 97 a leakage occurs in the form of water flow from ports 95 and 97 to ports 94 and 96 through the clearance. The water flow through the clearance is maintained small by maintaining the clearance narrow. The small water flow provides a lubrication and cleaning function which prevents binding of rotor 79 with housing liner 92. Secondly another unique feature of the transmission device 2 is the retaining of coal by screen 80 while allowing a liquid drawing action. During filling of a pocket 81 in the rotor 79, water is drawn through the peripheral slots in screen 80. The constructional form of the transmission device 2 is such that self-cleaning of the screen 80 is provided, such cleaning being performed by the edge of the rotor pocket as the edge passes over the slots. Thirdly, the liner 92 may be provided with one or more grooves 98 adjacent the port openings 95 and 97, as shown in FIG. 4. The grooves 98 are formed with a peripheral dimension which is greater than the dimension measured in the radial direction, so that a water flow from pump 9 at high pressure into the pocket openings 95 and 97 is exposed to strong choking action. Consequently, shocks and vibrations originating on pocket to port opening are milder reducing the tendency of coal particles to break.

The water used as a conveying medium tends to provide two means for preventing cutting of coal particles when the rotating wheel pocket edge closes housing filling port 94 to the rotor pocket when the rotor 79 rotating at a low RPM, preferably 5 to 10 RPM. The water provides some buoyancy to the coal particles since the particles density is preferably only from 1.2 to 1.4 times greater than that of the water. Since the particle density is just slightly greater than the water, the pocket edge will tend to push the particle away rather than pinch or cut off the particle between the pocket edge and the housing filling port edge. As the pocket being filled closes off to the filling port, the pocket in the parallel row of pockets is approaching full open to the filling port so that the majority of water flow is through this pocket carrying most of the particles into this pocket leaving nearly none to be pinched off by the closing pocket. A housing equalizing line 89 is provided communicating the housing end bells 90 and 91 for the purpose of equalizing the pressure in the housing end bells to prevent end thrust upon bearings. A specific advantage of the transmission device is that the pressure at ports 95 and 97 are nearly equal and the pressure at ports 94 and 96 are nearly equal producing nearly no side thrusts on rotor 79 and associated bearings.

Referring again to FIG. 2, coal entering separator 100 through inlet port 99 is lifted by a hollow screw mechanism through a free water surface 111, said screw mechanism is simply a pipe 103 with a scraper plate 105 solidly attached to it and going spirally around the pipe periphery. At the top of the pipe 103 are attached two or more support arms 108 connected to a turning shaft 109, said shaft penetrating a housing 101 of the separator through a shaft sealing mechanism 110. The coal lifting screw mechanism is fitted over a stand pipe 104 which prevents water from entering the drained coal outlet and provides a means to direct the drained coal to the next apparatus of the process. Fitted around the coal lifting screw mechanism is a screen 106 coming nearly in contact with scraper 105, said screen surrounding the lifting screw and being rigidly attached to the separator housing 101, the coal particles are lifted by the screw mechanism through the free water surface 111. While being lifted, water is strained from the coal through screen 106 and discharged from outlet 102 for return to the transmission device 2, to continue coal transfer. After being lifted through the free water surface 111, water begins to drain from the coal. The drained coal is spilled into stand pipe 104, such spilling being directed by a deflector 107. Since all surface water cannot be removed by simple draining, some water will be carried from the separator 100 with the coal. This carryover results in a net loss of water from the high energy water circulation system which cannot be made up from the low energy water circulation system. This loss is reflected as a lowering of the free water surface 111. The water lost with the coal is replenished by the makeup water system through valve 16. Level sensor 18 detects the lowering of water level 111 and reflects said lowering as a signal to valve controller 17 which throttles valve 16 to supply new water through conduits 116 and 114 sustaining the water level 111.

Coal dropping by gravity from stand pipe 104 enters continuous centrifuge inlet 201. The continuous centrifuge 4 includes the two concentric cones 38 and 39 spinning in a pressurized housing 225. Cone 39 is a hollow shell mounted on a base plates 226 with supporting ribs. Attached to the base plate is a shaft 211 for turning the cone 39. Cone 39, the inner cone, is held in position by two or more fixed supports 213 mounted rigidly to the housing 225, said supports being fixed at the upper end to a thrust bearing mechanism 209 supporting and allowing the turning of inner cone 39. Shaft 211 is turned by shaft 213 via gears 212. Shaft 213 penetrates the pressurized housing 225 through a shaft seal 214. Mounted rigidly to the outer surface of inner cone 39 are one or more scraper plates 204 going spirally around the cone 39 surface to form a screw.

There are two such scraper plates shown in FIG. 2 constituting a double pitch screw. The scraper plates nearly touch the inner surface of the outer cone 38 which is primarily composed of screen plate at its larger end. The small upper end of cone 38 is formed into a gear and bearing surface 207. A deflector plate 224 is provided to prevent fines from entering the bearing mechanism. Suitable bearings 208 support and allow spinning of cone 38. Cones 38 and 39 spin at nearly equal RPM, said spinning rate being sufficient to cause coal in the annular space between cones 38 and 39 to move the inner surface of outer cone 38 by centrifugal force. Surface water is thrown from the coal through the screen of the outer cone 38, said removed water then drains down the housing wall to a water trap formed by wall 214 permanently attached to the housing 225. The water is drained from this trap back to chute 1 through valve 19 and conduit 222. The water level in the trap is continuously maintained to form a water seal to prevent gas from escaping the centrifuge, said water level being monitored by level sensor 21 which signals controller 20 to throttle the opening of valve 19. A flushing system can be provided to prevent fines settling in the trap. For this flushing, clarified water is obtained through conduit 218, valve 217 and conduit 216. The movement of coal through the centrifuge 4 is controlled by the differential speed of cones 38 and 39. The centrifuge of FIG. 2 represents an illustrative constructional form of a type of mechanical dryer that could be used for this process invention to accomplish surface water removal. The centrifuge in FIG. 2 is simplified and in practice the cocentric cones are driven by a single shaft with a differential gear. The cone angle of the illustrated centrifuge is exaggerated to describe the principle. Again, the type of mechanical dryer is dependent upon the properties of the coal being conveyed.

After mechanical drying the coal moves by gravity to crusher 5, entering through an inlet port 301. The crusher 5 is illustrated constructionally as a double roll 302 type. The crushed coal is removed from the crusher 5 by gravity through outlet port 303 and into bin 304.

Coal is metered from bin 304 into pulverizer 6 by metering device 401 containing a metering wheel 402 which meters crushed coal into the pulverizer inlet 403. The pulverizer which may be of any constructional form is illustrated in FIG. 2 as a ball and race pulverizer now in commercial use. The pulverizer is surrounded by a pressurized housing 423. The pulverizing is performed between races 404 and 410 by multiple balls 409. Crushed coal moves by gravity onto race 404, said race 404 being constructional configured to cause the coal to move by centrifugal force to the grinding zone. Race 404 rotates as driven by shaft 405 penetrating the housing 423 through sealing mechanism 406. Race 410 is stationary, being forced down on balls 409 by multiple springs 411 fixed to race 410. The force applied by race 410 upon balls 409 is adjusted by a threaded adjusting mechanism 412, said adjustment being made by turning handle 414. The adjusting mechanism penetrates the pressurized housing 423 through sealing mechanism 413. Coal moving in between the races 404 and 410, is pulverized by the rolling action of balls 409. The ground coal moves radially away from the balls 409 and is swept upward by gas supplied from fan 22 through conduit 421. The gas is expelled through annular orifice 408 formed by peripheral ring 407, to sweep the pulverized coal upward. The gas and entrained coal flows into cyclone separator 416 used to classify the pulverized coal. The gas and entrained coal enter the cyclone separator 416 through multiple openings 418 where cyclone action is imparted by multiple deflector plates 419 rigidly attached to the separator. The gas and entrained coal spin around tube 417 causing heavier coal particles not sufficiently pulverized to move to the inner surface of the cyclone separator. The coal particles sufficiently pulverized are swept up through tube 417 and outlet port 420. The heavier coal particles are drawn down the separator by impellor 415, attached to race 404, for regrinding. The classifying in the cyclone separator 416 is controlled by the gas velocity induced by fan 22.

Gas and entrained pulverized coal ejected from pulverizer 6 is directed by conduit 501 to cyclone separator 7, configured to provide a cyclone effect to the gas and coal, causing the pulverized coal to drop out to the cyclone separator bottom 503 to be discharged through conduit 504 for supply to the gasifier. Gas, separated from the coal, is discharged through a separator outlet 506 and flows through conduit 507, conduit 508, valve 24, conduit 511 and back to fan 22 through conduit 512 for recycle. Valve 24 is throttled to control the gas velocity through the pulverizer 6, said velocity control could as well be performed by a variable speed fan. It is a common practice to accomplish drying of the coal in a pulverizer by maintaining the recycle gas above the dew point of the water inherent to the coal being pulverized. This can be accomplished by bringing clean, hot synthesis gas into the gas recycle system through conduit 514 and controllable valve 23 to the inlet of fan 22. After the gas is cooled while passing through the pulverizer 6, a slip stream of the cool gas is taken off through conduit 509, controllable valve 25 and conduit 516 to be introduced back into the synthesis gas product outlet.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

What is claimed is:

1. A process of converting coal or the like particles into gas, heat, or gas and heat within a processing chamber maintained under a predetermined elevated pressure in which the particles are fed to the chamber in a dry finely sized form less than ⅜ inch nominal diameter and maintained therein during processing in an agitated condition, the improvement which comprises the steps of:

confining a liquid within a first path including a first volume defining a first free surface exposed to pressure conditions which are low with respect to said predetermined elevated pressure of said processing chamber.

progressively introducing a supply of particles of a size range larger than said finely sized form into the liquid within said first confined path downwardly through the free surface thereof, confining liquid within a second path which is circuitous and includes a second volume defining a second free surface communicating with a zone having an elevated pressure of the order of said predetermined elevated pressure of said processing chamber, continuously circulating the liquid within said second circuitous path by pumping the same at a pumping position spaced from said second volume, progressively removing successive incremental volumes of liquid and entrained particles within said first path and communicating said successive removed volumes of liquid and entrained particles with the liquid flowing in said second path at a position between said pumping position and said second volume, progressively collecting the particles within said second volume and moving the same upwardly through said second free surface and into said zone, progressively converting the particles moved into said zone into said dry finely sized form while maintaining the same under the aforesaid pressure of the order of said predetermined elevated pressure of said processing chamber and then progressively feeding the particles in dry, finely sized form into the processing chamber under said predetermined pressure.

2. A process as defined in claim 1 wherein said successive incremental volumes are removed from said first path by maintaining a continuous flow of liquid and entrained particles from said first volume into an incremental volume removal position within said first path, blocking the flow of particles above a predetermined fine particle size range at said incremental volume removal position while permitting liquid and particles less than said predetermined size range to flow beyond said incremental volume removal position, and successively removing an amount of blocked particles and the liquid entraining the same at the time of removal equal to said incremental volume.

3. A process as defined in claim 1 wherein the particles moved upwardly through said second free surface are conveyed upwardly above said second free surface while allowing the liquid to drain therefrom by gravity back into said second volume and then are allowed to fall by gravity into said zone.

4. A process as defined in claim 3 wherein said particles moved into said zone are converted into said dry finely sized form by the following enumerated steps all of which are performed under pressure as aforesaid: (1) subjecting said particles to a surface liquid reducing treatment, (2) crushing the particles to an intermediate size which reduces the percentage of surface liquid associated therewith, (3) pulverizing the crushed particles to a fine size, (4) classifying and finally drying the pulverized particles to obtain particles below a predetermined fine size less than ⅜ inch nominal diameter, and (5) feeding the dry particles below said predetermined fine size into said processing chamber.

5. A process as defined in claim 4 wherein the aforesaid enumerated steps (4) and (5) are accomplished through movement of the particles by entrainment within a flowing heated gas stream maintained within said zone.

6. A process as defined in claim 5 wherein said surface liquid reducing treatment comprises subjecting the particles to a centrifugal force, restraining the movement of the particles in the direction of the application of said centrifugal force while allowing surface liquid to move in said direction to thereby separate the thusly moved portion of the surface liquid from said restrained particles.

7. A process as defined in claim 6 wherein the removed liquid is recirculated to said first path.

8. A process as defined in claim 7 including progressively removing successive generally equal volume volumes liquid from communication with said second flow path and communicating said successive equal volumes of liquid with the first path whereby the exchange of said volumes of liquid and said volumes of particles with entrained liquid between said paths has the effect of tending to increase the liquid in said first path and to decrease the liquid flowing in said second flow path and maintaining the liquid in said paths substantially constant.

9. A process as defined in claim 2 including progressively removing successive generally equal volumes of liquid from communication with said second flow path and communicating said successive equal volumes of liquid with the first path whereby the exchange of said volumes of liquid and said volumes of particles with entrained liquid between said paths has the effect of tending to increase the liquid in said first path and to decrease the liquid flowing in said second flow path and maintaining the liquid in said path substantially constant.

10. A process as defined in claim 9 wherein the exchange of said successive volumes of liquid and said volumes of particles and liquid between said paths is performed continuously in such a way that the quantity of flow in each path is constant.

11. A process as defined in claim 1 wherein the liquid flowing in said first flow path is pumped from a pumping position between said incremental volume removal position and said first volume, the liquid flowing in said first flow path being purified by separation at a fine separation position down stream from said incremental volume removal position and said pumping position.

12. Apparatus for converting coal or the like particles into gas, heat or gas and heat, including a processing chamber maintained under a predetermined elevated pressure, and means for feeding to said chamber particles in a dry finely sized form less than ⅜ inch nominal diameter and maintaining the same in an agitated condition therein during processing, the improvement therein which comprises:

means for confining a liquid within a first path including a first volume defining a first free surface exposed to pressure conditions which are low with respect to said predetermined elevated pressure of said procesing chamber, means for progressively introducing a supply of particles of a size range larger than said finely sized form into the liquid within said first confined path downwardly through the free surface thereof, means defining a high pressure zone, means for confining liquid within a second path which is circuitous and includes a second volume defining a second free surface communicating with said zone having an elevated pressure of the order of said predetermined elevated pressure of said processing chamber, means for continuously circulating the liquid within said second circuitous path by pumping the same at a pumping position spaced from said second volume, means for progressively removing successive incremental volumes of liquid and entrained particles within said first path and communicating said successive removed volumes of liquid and entrained particles with the liquid flowing in said second path at a position between said pumping position and said second volume, means for progressively collecting the particles within said second volume and moving the same upwardly through said second free surface and into said zone, means for progressively converting the particles moved into said zone into said dry finely sized form while maintaining the same under the aforesaid pressure of the order of said predetermined elevated pressure of said processing chamber and means for progressively feeding the particles in dry, finely sized form into said processing chamber under said predetermined pressure.

13. Apparatus as defined in claim 12 wherein said incremental volume removal means includes means for maintaining a continuous flow of liquid and entrained particles from said first volume into an incremental volume removal position within said first path, means for blocking the flow of particles above a predetermined fine particle size range at said incremental volume removal position while permitting liquid and particles less than said predetermined size range to flow beyond said incremental volume removal position, and means for successively removing an amount of blocked particles and the liquid entraining the same at the time of removal equal to said incremental volume.

14. Apparatus as defined in claim 13 wherein said means for moving the particles upwardly through said first free surface comprises conveyor means for moving the particles upwardly above said first free surface while allowing the liquid associated therewith to drain therefrom by gravity back into said second volume, so as to allow the same to fall by gravity into said zone.

15. Apparatus as defined in claim 14 wherein said particles converting means includes (1) means for subjecting said particles to a surface liquid reducing treatment, (2) means for crushing the particles to an intermediate size which reduces the percentage of surface liquid associated therewith, (3) means for pulverizing the crushed particles to a fine size, (4) means for classifying and finally drying the pulverized particles to obtain particles below a predetermined fine size less than ⅜ inch nominal diameter, and (5) means for feeding the dry particles below said predetermined fine size into said processing chamber.

16. Apparatus as defined in claim 15 wherein said feeding means includes means for maintaining a flowing heated gas stream within said zone within which said particles are entrained and thereby moved.

17. Apparatus as defined in claim 16 wherein said means for subjecting said particles to surface liquid reducing treatment comprises means for subjecting the particles to a centrifugal force, means for restraining the movement of the particles in the direction of the application of said centrifugal force, and means for allowing surface liquid to move in said direction under the action of said centrifugal force to thereby separate the thusly moved portion of the surface liquid from said restrained particles.

18. Apparatus as defined in claim 17 including means for recirculating the removed liquid to said first path.

19. Apparatus as defined in claim 18 wherein said successive volume removing means is further operable to progressively remove successive generally equal volumes of liquid from communication with said second flow path and to communicate said successive volumes of liquid with the first path whereby the exchange of said volumes of liquid and said volumes of particles with entrained liquid between said paths has the effect of tending to increase the liquid flowing in said first path and to decrease the liquid in said second flow path and means for maintaining the liquid in said paths substantially constant.

20. Apparatus as defined in claim 13 wherein said means for continuously removing and communicating successive volumes comprises a transmission device comprising housing means having first flow path inlet means and outlet means and second flow path inlet means and outlet means formed therein, a rotor rotatably mounted in said housing means having a plurality of separate pockets extending therethrough for alternately communicating between said first flow path inlet means and outlet means and said second flow path inlet means and outlet means during rotation thereof within said housing, and screen means in said first flow path outlet means.

21. Apparatus as defined in claim 20 wherein said first flow path inlet means includes a pair of first inlet ports spaced axially with respect to the rotational axis of said rotor, said first flow path outlet means including a pair of axially spaced first outlet ports axially aligned with and displaced 180° from said first inlet ports with respect to the rotational axis of said rotor, said second flow path inlet means including a pair of axially spaced second inlet ports axially aligned with and displaced 90° from said first inlet ports, said second flow path outlet means including a pair of axially spaced second outlet ports axially aligned with and displaced 180° from said second inlet ports, said rotor pockets including two axially spaced rows of pockets each containing two separate pockets of generally uniform cross-sectional area, each pocket of each row having axially aligned ends displaced 180° from each other with the ends of one pocket being displaced 90° with respect to the ends of the other pocket of the row and 45° with respect to the ends of a comparable pocket in the other row, the shape of the ends of said pockets being related to the shape of said ports such that each end during the rotation of said rotor moves progressively from a position of generally zero communication to full communication and then back to generally zero communication with each successive port axially aligned therewith.

22. Apparatus as defined in claim 20 wherein said rotor is tapered, said housing means being correspondingly, and said transmission device further includes an adjusting hardwheel for setting the clearance between the tapered rotor and said tapered housing means.

23. Apparatus as defined in claim 22 wherein said housing means includes a liner engaging said pocketed rotor for the purpose of wear.

24. Apparatus as defined in claim 23 wherein said liner is formed with grooves adjacent the edges thereof defining said second inlet and outlet ports, said grooves having a peripheral dimension which is greater than the dimension measured in the radial direction, said grooves decreasing in depth with increasing distance from the edge of the pocket.

25. Apparatus as defined in claim 21 wherein said volume confining means comprises a pressure tight housing formed with an inlet for receiving the liquid flowing in said second flow path therein and an upper annular portion in pressure communicating relation with said zone, an annular screen within said housing, said housing including an annular portion disposed outwardly of said annular screen and having an outlet therein for passage of liquid within said second flow path downstream of said discharge position, said coal particle moving means including a screw conveyor mounted within said housing for rotation about an upright axis with its periphery adjacent said annular screen.

* * * * *